UNITED STATES PATENT OFFICE.

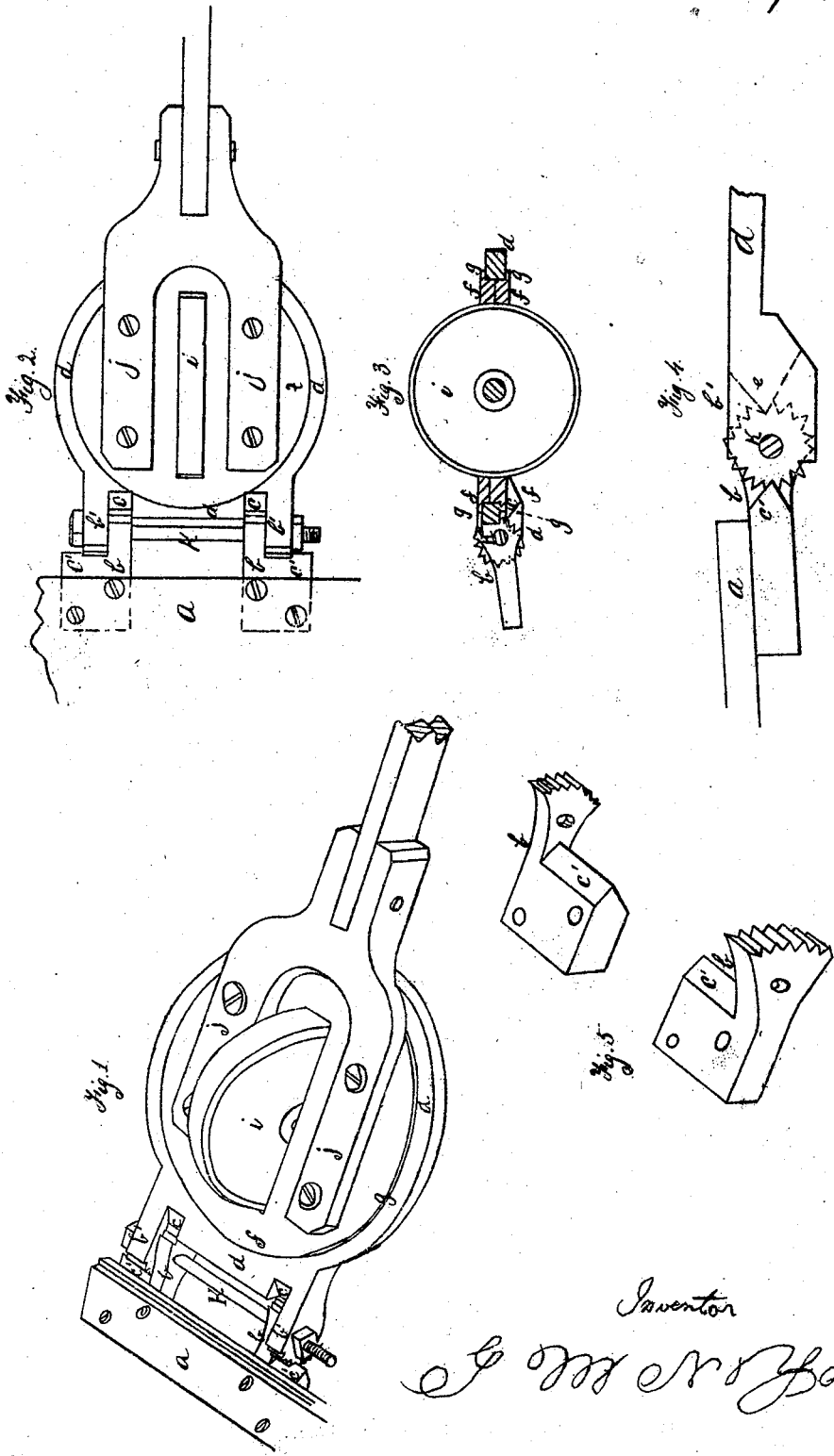

GEO. W. N. YOST, OF PITTSBURG, PENNSYLVANIA.

IMPROVEMENT IN GRAIN AND GRASS HARVESTERS.

Specification forming part of Letters Patent No. 14,582, dated April 1, 1856.

*To all whom it may concern:*

Be it known that I, G. W. N. YOST, of Pittsburg, in the county of Allegheny and State of Pennsylvania, have invented an Improvement in Raising and Lowering the Cutter-Bar of Harvesters, &c.; and I do hereby declare that the following is a full, clear, and exact description of the principle or character which distinguishes it from all other things before known, and of the usual manner of making and modifying the same, reference being had to the annexed drawings, of which—

Figure 1 represents a perspective view of part of a cutter-bar, and showing the connection of the racks with the caster; Fig. 2, a plan of same; Fig. 3, a vertical middle section; Fig. 4, a detached and enlarged side view of the racks $b'$ and $b$, and showing the rack $b$ in dotted lines geared into tooth $c$, which is also shown in dotted lines; Fig. 5, right and left views of racks $b\ b$ and teeth $c'\ c'$.

My invention consists in the application to harvesters of a peculiar kind of caster for the purpose of preventing side-draft on the team, and also for regulating the cutter-bar to any desired height, for the purpose of cutting high or low grain or grass, while at the same time the weight of the machine is taken off the horse's neck, which I describe as follows: This peculiar arrangement is of such a character that I combine with a very trifling expense three very important objects, which have hitherto been a very serious inconvenience and expense in this class of invention, which has been the subject of so many inventions, to simplify and render these parts of a harvester practicable and at the same time light, and to take up as little room as possible. These difficulties I have surmounted, and made my combination wonderfully adaptable to almost any form of harvester in which it is necessary to cut grain or grass at different heights and to lessen the labor of the team by preventing the side-draft on the team.

To the cutter-bar $a$ are fastened two projecting racks, $b\ b$, the teeth of which take into teeth $e\ e$ on the rim $d$ of the caster. There are also similar racks, $b'\ b'$, on this rim $d$, which take into teeth $c'\ c'$ on each side of the racks $b\ b$. These racks are placed together, as shown in Figs. 1 and 2, and secured in this position by the king-bolt $k$. $f\ f$, two circular plates, each plate having a flange, $g\ g$, on its periphery, and when bolted together they form a double flange for the reception of the rim $d$, which rim serves to keep in place the plates, (which, when bolted together, form a single plate,) and to allow them a free horizontal motion. The caster-wheel $i$ turns on an axle secured between these plates $f\ f$. Upon the upper surface of these plates, and fastened to them, are two hounds, $j\ j$. These hounds form the shaft-connecter, which shaft is fastened to it and allowed a free perpendicular motion, which takes the weight of the machine off the team. By the peculiar arrangement of the caster and the free horizontal motion given to the plates $f\ f$ and caster-wheel $i$, I prevent the side-draft of the machine from compelling the team to draw sidewise, which would be the case were this motion not given to them—as in the case of Manny and others, where the tongue is stiff—and in turning the machine the tongue presses against the horses, and when the machine is cutting the draft draws the tongue against the inside horse, and it, drawing against the other horse, makes it a very difficult matter for them both to work with facility and ease. All this difficulty I obviate, as above stated. The caster is so set that the draft on the cutter-bar while in the act of cutting will not materially affect the cutting of the swath in a right line with the track of the team.

The operation of adjustment is as follows: When I wish to raise the cutter-bar all that is to be done is to unscrew the nut of the king-bolt, draw it out, set the teeth of the rack at the required height, and place back the bolt, and the work is completed; and when I wish to lower it the same operation is performed, which requires only a very few minutes; and I do away with the frame-work commonly used, and which is expensive, burdensome to the machine, and liable to get out of order.

I claim—

The combination of the racks $b\ b\ b'\ b'$ and king-bolt $k$, arranged as set forth, for adjusting the cutter-bar of harvesters.

GEO. W. N. YOST.

Witnesses:
R. T. CAMPBELL,
JOSEPH SMITH.